United States Patent
Khandewale et al.

(10) Patent No.: US 9,419,931 B2
(45) Date of Patent: Aug. 16, 2016

(54) METHOD OF ALERTING A USER OF IMPORTANT EVENTS FROM A PLURALITY OF SOURCES AND A SYSTEM THEREOF

(71) Applicant: Synchronoss Technologies, Inc., Bridgewater, NJ (US)

(72) Inventors: Rajesh Khandewale, Sunnyvale, CA (US); David Hegarty, San Francisco, CA (US)

(73) Assignee: Synchronoss Technologies, Inc, Bridgewater, NJ (US)

(*) Notice: Subject to any disclaimer, the term of this patent is extended or adjusted under 35 U.S.C. 154(b) by 191 days.

(21) Appl. No.: 14/216,903

(22) Filed: Mar. 17, 2014

(65) Prior Publication Data

US 2014/0280660 A1    Sep. 18, 2014

Related U.S. Application Data (63) Continuation-in-part of application No. 14/209,760, filed on Mar. 13, 2014.

(60) Provisional application No. 61/793,419, filed on Mar. 15, 2013.

(51) Int. Cl.
| | |
|---|---|
| *G06F 15/16* | (2006.01) |
| *G06F 15/173* | (2006.01) |
| *H04L 12/58* | (2006.01) |
| *H04L 29/08* | (2006.01) |
| *G06Q 50/00* | (2012.01) |
| *G06Q 10/10* | (2012.01) |
| *G06F 9/54* | (2006.01) |
| *H04W 4/02* | (2009.01) |

(52) U.S. Cl.
CPC ............. *H04L 51/24* (2013.01); *G06Q 10/109* (2013.01); *G06Q 50/01* (2013.01); *H04L 67/26* (2013.01); *G06F 9/542* (2013.01); *G06Q 10/10* (2013.01); *H04L 67/306* (2013.01); *H04W 4/02* (2013.01)

(58) Field of Classification Search
CPC ........ G06Q 10/10; G06Q 50/01; G06F 9/542; H04W 4/02
USPC .................................................. 709/226, 207
See application file for complete search history.

(56) References Cited

U.S. PATENT DOCUMENTS

| | | | |
|---|---|---|---|
| 9,152,992 B1* | 10/2015 | Vippagunta | G06Q 30/0631 |
| 2008/0243853 A1* | 10/2008 | Reding | H04L 51/32 |
| 2009/0276284 A1* | 11/2009 | Yost | G06Q 10/10 |
| | | | 705/14.53 |
| 2010/0180001 A1* | 7/2010 | Hardt | G06F 11/32 |
| | | | 709/207 |

(Continued)

*Primary Examiner* — Hieu Hoang
(74) *Attorney, Agent, or Firm* — Synchronoss Technologies, Inc.; Frederick W. Dour (57) ABSTRACT

Embodiments of the present invention relate to event notifications on an end-user device of events that are important to a user of the device. The user is typically subscribed to a service that pulls events from a plurality of sources indicated by the user. The sources include a native address book on the device, a social network(s), a professional network(s), and/or another remote location(s) on the Internet. Around the occurrence of an event, the service allows for automatically generating an electronic wish and for purchasing a gift to be presented to one or more recipients associated with the event. The service can transmit the content in various forms and can include a monetizing scheme. The service is able to intelligently determine which events are important to the user such to alert the user of only those relevant events, and to intelligently select an appropriate channel for transmitting the content.

29 Claims, 5 Drawing Sheets

(56) References Cited

U.S. PATENT DOCUMENTS

| | | | | |
|---|---|---|---|---|
| 2010/0211917 A1* | 8/2010 | Tsuei | | H04M 1/236 715/840 |
| 2012/0166267 A1* | 6/2012 | Beatty | | G06Q 30/0247 705/14.21 |
| 2012/0190386 A1* | 7/2012 | Anderson | | G01C 15/04 455/456.3 |
| 2013/0182963 A1* | 7/2013 | Cok | | G06K 9/00677 382/228 |
| 2013/0298030 A1* | 11/2013 | Nahumi | | H04W 4/04 715/733 |
| 2014/0032678 A1* | 1/2014 | Koukoumidis | | G06F 17/30867 709/205 |
| 2014/0067671 A1* | 3/2014 | DeHaven | | G06Q 20/28 705/44 |

* cited by examiner

METHOD OF ALERTING A USER OF IMPORTANT EVENTS FROM A PLURALITY OF SOURCES AND A SYSTEM THEREOF

RELATED APPLICATIONS

This patent application is a continuation in part of the co-pending U.S. patent application Ser. No. 14/209,760, filed Mar. 13, 2014, entitled "A Method of Alerting a User of Important Events and a System Thereof," which is hereby incorporated by reference in its entirety. The U.S. patent application Ser. No. 14/209,760 claims benefit of priority under 35 U.S.C. section 119(e) of the U.S. Provisional Patent Application Ser. No. 61/793,419 filed Mar. 15, 2013, entitled "Mobile Applications," which is also hereby incorporated by reference in its entirety.

FIELD OF INVENTION

The present invention relates to event notification. More particularly, the present invention relates to method of alerting a user of important events and a system thereof. The important events are aggregated from a plurality of sources indicated by the user.

BACKGROUND OF THE INVENTION

A user does not necessarily store all important events, including birthdays and anniversaries, at a single location such as on a user's client device. With the prevalence of numerous social networking services and professional networking services, the user does not need to store all of these events at a single location since the user is able to rely on these networking services to alert the user of events. For example, Facebook® is able to alert the user of her friends' birthdays and wedding anniversaries, and LinkedIn® is able to alert the user of her colleagues' work anniversaries and new promotions/jobs. However, the user must be logged into these services in order to receive such notifications. When the user is not logged in one or more of these services, the user can miss a notification of an important event. Yet, even if the user is logged in, the user may not have the time or the resources necessary to let a friend know that she is thinking of the friend regarding that event.

BRIEF SUMMARY OF THE INVENTION

Embodiments of the present invention relate to event notifications on an end-user device of events that are important to a user of the device. The user is typically subscribed to a service that pulls events from a plurality of sources indicated by the user. The sources include a native address book on the device, a social network(s), a professional network(s), and/or another remote location(s) on the Internet. Around the occurrence of an event (e.g., either before, during and/or after), the service allows for automatically generating an electronic wish and for purchasing a physical or digital gift to be presented to one or more recipients associated with the event. The service can transmit the content in various forms and can include a monetizing scheme. The service is able to intelligently determine which events are important to the user such to alert the user of only those relevant events, and to intelligently select an appropriate channel for transmitting the content.

In one aspect, a non-transitory computer-readable medium is provided. The non-transitory computer-readable medium stores instructions that, when executed by a computing device, cause the computing device to perform a method. The method includes aggregating events from a plurality of sources. The plurality of sources is typically pertinent to a user. The plurality of sources can include at least one personal source such as an address book or a calendar. In some embodiments, the address book and/or calendar are native to an end-user device. The plurality of sources can include at least one public source such as a public calendar or another public source of information for events located on the Internet. The plurality of sources can include a networking service, such as a professional networking service or a social networking service.

The events can include birthdays, anniversaries and holidays. The holidays can include national holidays, international holidays or both. The events can also include the user's own personal events.

The method also includes, at a point in time within a period surrounding at least one of the events, reminding the user of that event and providing the user an option to act upon that reminder such that at least one recipient associated with that event receives an acknowledgment regarding that event. In some embodiments, the event is important to the user. The reminder can be in a form of an email, a text message, a device notification, voice call, video call, multimedia message, video message, printed notification or other suitable forms.

In some embodiments, the option is presented to the user on the end-user device.

In some embodiments, the acknowledgment is in a form of a gift or an electronic wish. The electronic wish can be provided in a voice call, a text message, an email, an instant message, a video chat, a post to a live feed, a post to a profile, or other suitable communication channels.

In some embodiments, the method also includes, after providing the user with an option, generating a file associated with the at least one recipient. The file can be automatically generated based on a user defined group or a predefined group. Alternatively, the file can be manually generated by the user. The file can be a media file or a multimedia file. In some embodiments, the method also includes, after generating a file, allowing the user to edit the file prior to making the edited file available to the at least one recipient. In some embodiments, the method also includes, after generating a file, allowing the at least one recipient to view the file. Either the file or reference to the file can be included as part of an electronic wish.

In some embodiments, the method also includes, after providing the user with an option, enabling the user to purchase a gift from an external provider. The gift can be a physical gift or a digital gift. In some embodiments, the method also includes, after enabling the user to purchase a gift, monetizing the gift purchase.

In some embodiments, the method also includes maintaining historical data of user behavior of the user, and data mining actions of the user from the historical data to determine which events are important to the user to at least one of intelligently serve only events that are important to the user and intelligently select an appropriate channel of providing the acknowledgment to the at least one recipient. In some embodiments, the method further includes using the historical data for monetization.

In another aspect, a system is provided. The system includes an end-user device including a memory for storing a native address book, and a server in communication with at least the end-user device via a network. The server typically hosts a service configured to pull events from a plurality of sources, wherein the plurality of sources includes the native address book and a remote location on the network, learn from collected user behavior to determine which of the events are important to a user of the end-user device and, for each of the important events, transmit a reminder to the end-user device of that important event and provide the user an option to act upon that reminder such that at least one recipient associated with that event receives an acknowledgment regarding that important event. In some embodiments, the user of the end-user device is subscribed to the service, while the at least one recipient is not subscribed to the service.

The events can be manually pulled from the plurality of sources. Alternatively or in addition to, the events can be automatically pulled from the plurality of sources at periodic intervals.

In some embodiments, the service is also configured to provide an opportunity for the at least one recipient to subscribe to the service. In some embodiments, the service is also configured to automatically generate additional information around that important event. The additional information can be generated using backed up data of the user that is accessible by the server, remote data pulled from one or more of the plurality of sources or both.

In some embodiments, the acknowledgment is received by the at least one recipient via at least two communication channels.

In some embodiments, the service is also configured to provide the user on the user's birthday a photo montage of wishers. A size of each photo in the montage can be adjusted according to a social distance between the user and the respective wisher shown in the photo.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention relate to event notifications on an end-user device of events that are important to a user of the device. The user is typically subscribed to a service that pulls events from a plurality of sources indicated by the user. The sources include a native address book on the device, a social network(s), a professional network(s), and/or another remote location(s) on the Internet. Around the occurrence of an event (e.g., either before, during and/or after), the service allows for automatically generating an electronic wish and for purchasing a physical or digital gift to be presented to one or more recipients associated with the event. The service can transmit the content in various forms and can include a monetizing scheme. The service is able to intelligently determine which events are important to the user such to alert the user of only those relevant events, and to intelligently select an appropriate channel for transmitting the content.

Figure 1:
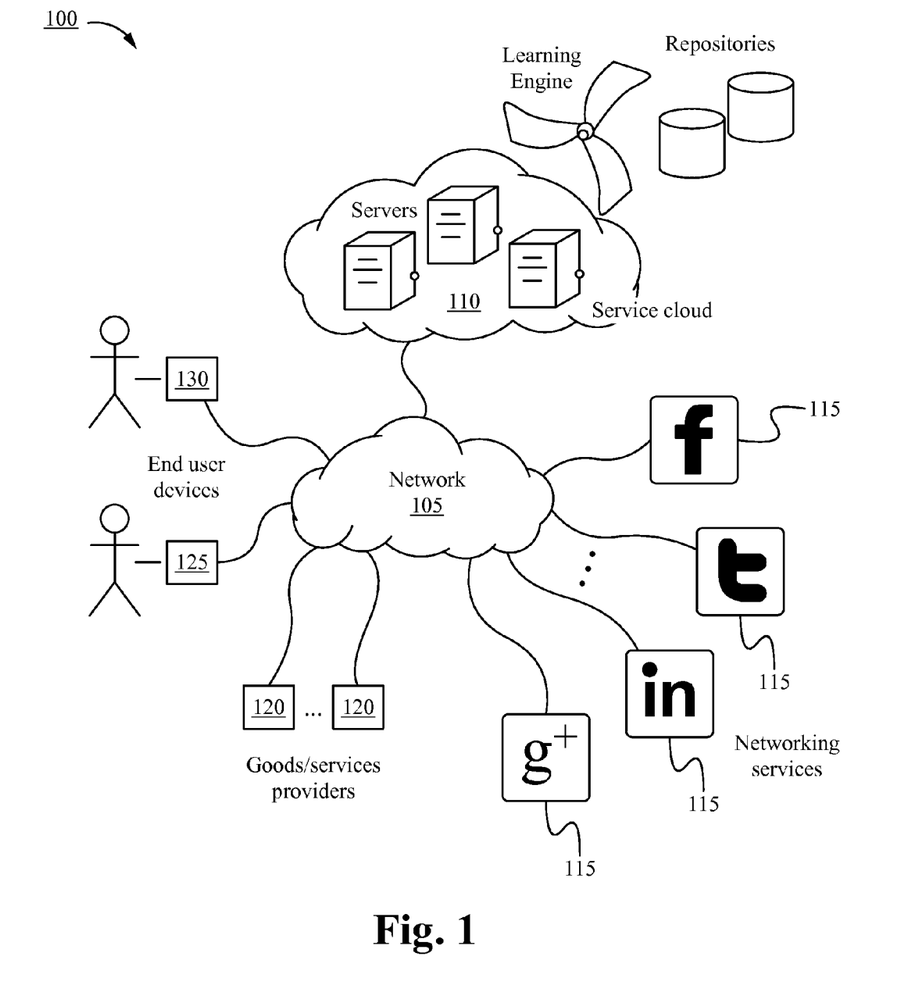
FIG. 1 illustrates an exemplary system according to an embodiment of the present invention.

FIG. 1 illustrates an exemplary system 100 according to an embodiment of the present invention. The system 100 typically includes a network 105, such as the Internet, and a service cloud 110 that is communicatively coupled with the network 105. Briefly, a server(s) in the cloud 110 is configured to provide a service to subscribed members of alerting events and providing the subscribed members an option to act upon these alerts such that at least one recipient associated with an event receives an acknowledgment regarding that event. The server can track history and other data, including usage, for monetization and for event notification. For example, the server can implement a learning engine which learns from the collected user behavior using the service to determine which events are important to a user and to alert the user of only those important or relevant events. In some embodiments, data such as the collected user interactions are stored in one or more repositories. The one or more repositories can be located in the cloud 110, as illustrated in FIG. 1, although the repositories can be located elsewhere in the system 100.

The system 100 also includes online networking services 115 and goods/services providers 120 that are communicatively coupled with the network 105. Online networking services 225 include social networking services, such as Facebook®, Twitter® and Google+™, and professional networking services, such as LinkedIn®. The partnered goods/services providers 120 can be a floral arrangement provider, a fruit arrangement provider, a gourmet chocolate provider or any provider of either goods, services or both.

The system 100 also includes at least two end-user devices 125, 130. The end-user device 125 belongs to a user who is a subscriber of the service. The subscriber is able to use the service from the end-user device 125 to act upon an alert of an event such that a recipient is able to receive an acknowledgment of the event. The acknowledgment can be a gift or an electronic wish. The electronic wish can be received at the end-user device 130 belonging to that recipient. The recipient not need be a subscriber of the service, although the recipient can be provided with an opportunity to subscribe to the service upon receiving an acknowledgment. If the recipient thereafter wishes to subscribe to the service, then the recipient is taken through a registration process to become a subscriber of the service.

In some embodiments, each subscriber has an account in the cloud 110. The account allows the subscriber to set his/her preferences. For example, the subscriber is able to schedule multiple reminders for each event, to set a frequency of reminder for each event, to select a preferred manner(s) of receiving reminders such as an email, a device notification, a pop-up message or a text message, to specify the number of days prior to or after commencement of each event to receive reminders, to specify one or more sources, such as the native address book and the networking services, to pull events from, and to specify preferred channel(s) to send electronic wishes to recipients. The subscriber is typically able to access the account via a web page or a client program installed on the end-user device 125.

Figure 2:
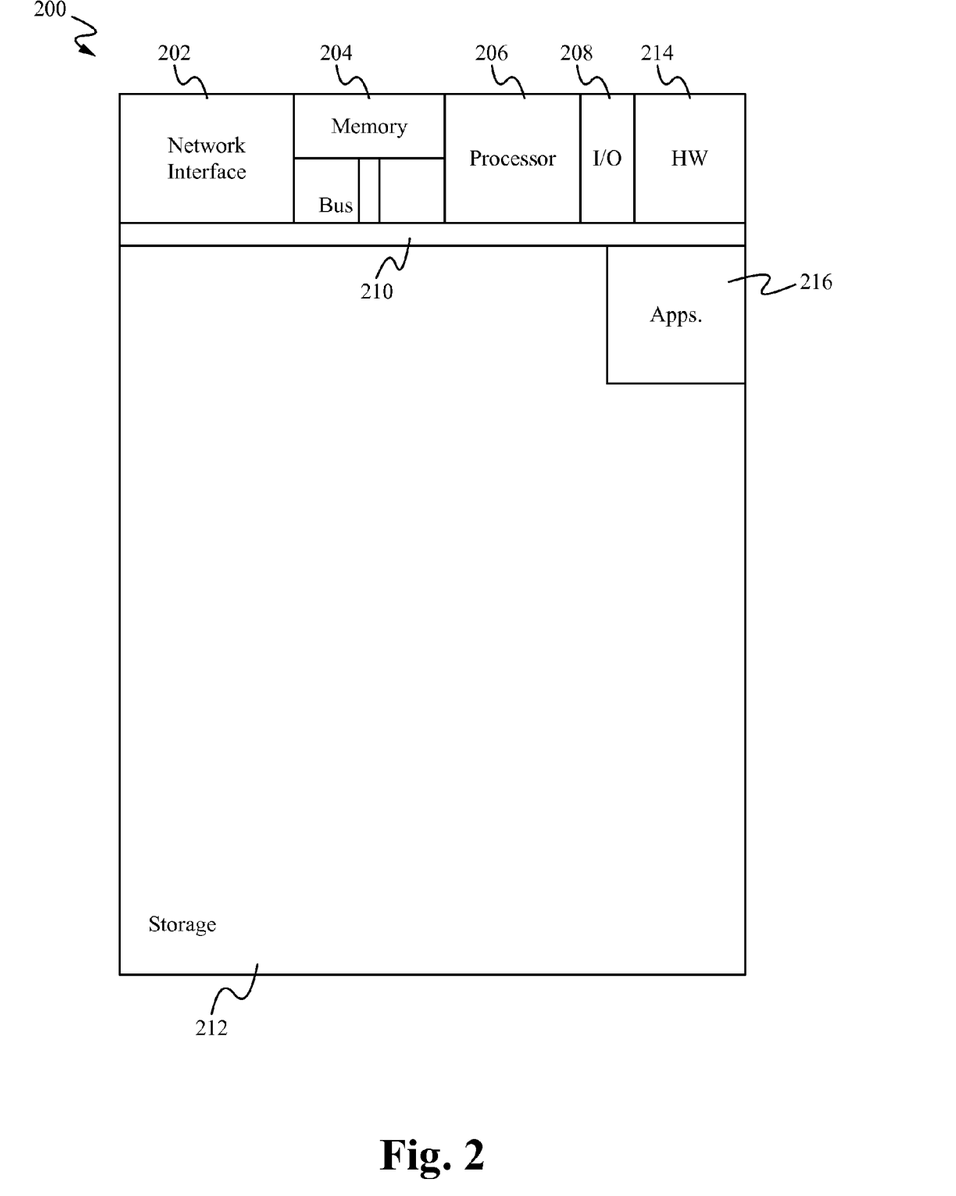
FIG. 2 illustrates a block diagram of an exemplary computing device according to an embodiment of the present invention.

FIG. 2 illustrates a block diagram of an exemplary computing device 200 according to an embodiment of the present invention. The computing device 200 is able to be used to acquire, cache, store, compute, search, transfer, communicate and/or display information. The server(s) in the cloud 110 and/or the end-user devices 125, 130 of the FIG. 1 can be similarly configured as the computing device 200.

In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 214, such as the client program or one or more server side applications implementing the service discussed above, are likely to be stored in the storage device 212 and memory 204 and are processed by the processor 206. More or less components shown in FIG. 2 are able to be included in the computing device 200.

The computing device 200 can be a server or an end-user device. Exemplary end-user devices include, but are not limited to, a tablet, a mobile phone, a smart phone, a desktop computer, a laptop computer, a netbook, or any suitable computing device such as special purpose devices, including set top boxes and automobile consoles.

Figure 3:
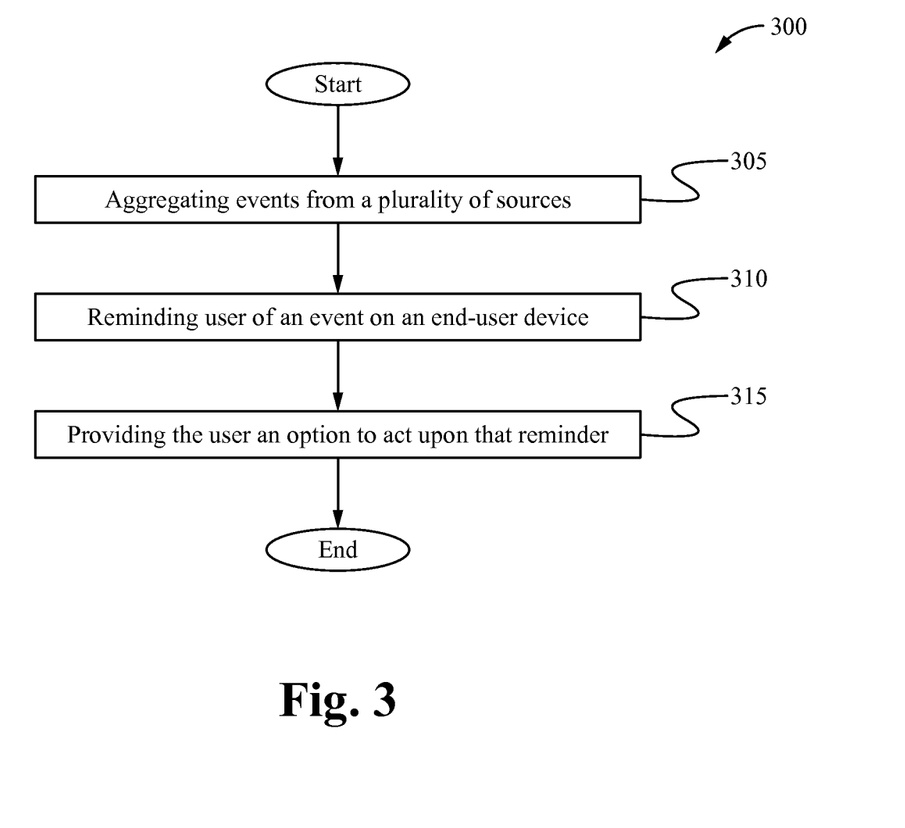
FIG. 3 illustrates an exemplary method of providing reminders for events according to an embodiment of the present invention.

FIG. 3 illustrates an exemplary method of providing reminders for events 300 according to an embodiment of the present invention. The server in the cloud 110 of FIG. 1 typically performs the method 300. The method 300 begins at a step 305, where events are aggregated from a plurality of sources. The plurality of sources is typically indicated by a user, who is a subscriber of the service, in his/her user account upon and after signing up for the service. As such, the plurality of sources is typically pertinent to the user. The plurality of sources can include one or more personal sources. Examples of personal sources are an address book and a calendar. The address book and the calendar can be native to the user's end-user device. The plurality of sources can also include one or more public sources. Examples of public sources are social calendars and other public sources of information for events on the Internet. The plurality of sources can also include networking service, including social networking services and professional networking services. The events are pulled from one or more of the plurality of sources.

The events pulled from one or more of the plurality of sources can include birthdays, anniversaries (e.g., wedding, work), holidays (e.g., national, international), personal events (either of a connection of the user—through one of the networking services—or of the user, or of both), or greeting/gifting occasions. In some embodiments, the user is able to directly add other events by editing the user's account in the cloud 110 of FIG. 1. In some embodiments, other data besides the events are also aggregated from the plurality of sources at the same time as or at a different time from when the events are aggregated. Other data including contact information (e.g., first name, last name, pictures, etc.) and additional information to be used as content of an electronic wish, which is discussed in detail below, can be aggregated from one or more of the plurality of sources.

In some embodiments, these events are manually pulled from the plurality of sources. Alternatively or in addition to, these events are automatically pulled from the plurality of sources at periodic intervals, such as daily, weekly or monthly. The user is able to set the frequency of the pull from the server in his/her user account in the cloud 110 of FIG. 1.

At a step 310, at a point in time within a period surrounding an event, the user is reminded of that event. In some embodiments, the reminder is in a form of an email, a text message or a device notification. Other forms of the reminder, such as voice call, video call, multimedia message, video message, and printed notifications, are contemplated.

At a step 315, the user is provided with an option to act upon that reminder such that each of one or more recipients associated with that event receives an acknowledgment regarding that event. The acknowledgment can be in a form of a gift or an electronic wish. An electronic wish can be provided in or during a voice call, a text message, an email, an instant message or a video chat with the recipient. An electronic wish can also be provided in a tweet in the user's Twitter® feed stream or a message post in the recipient's profile in Facebook®. Other channels of providing the electronic wish are also contemplated. In some embodiments, the recipient can receive an electronic wish via two or more of these communication channels. In some embodiments, the recipient can receive both a gift and an electronic wish. After the step 310, the method 300 ends.

Figure 4:
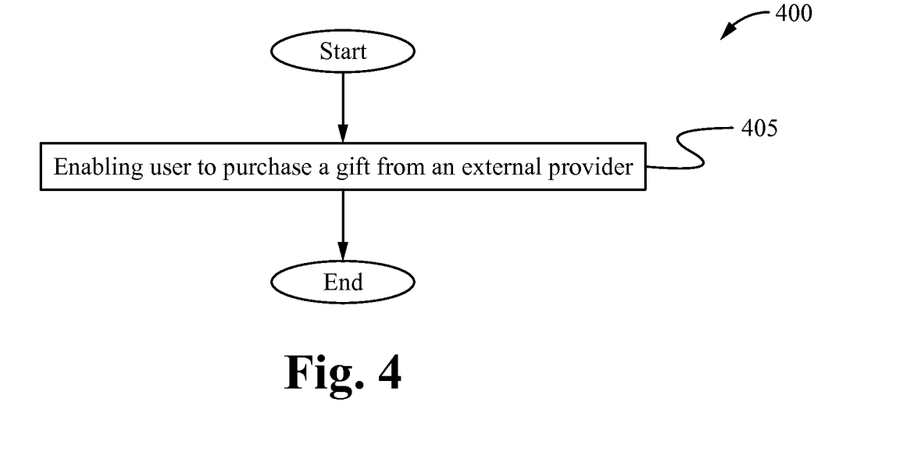
FIG. 4 illustrates a first exemplary method of acting upon a reminder according to an embodiment of the present invention.
Figure 5:
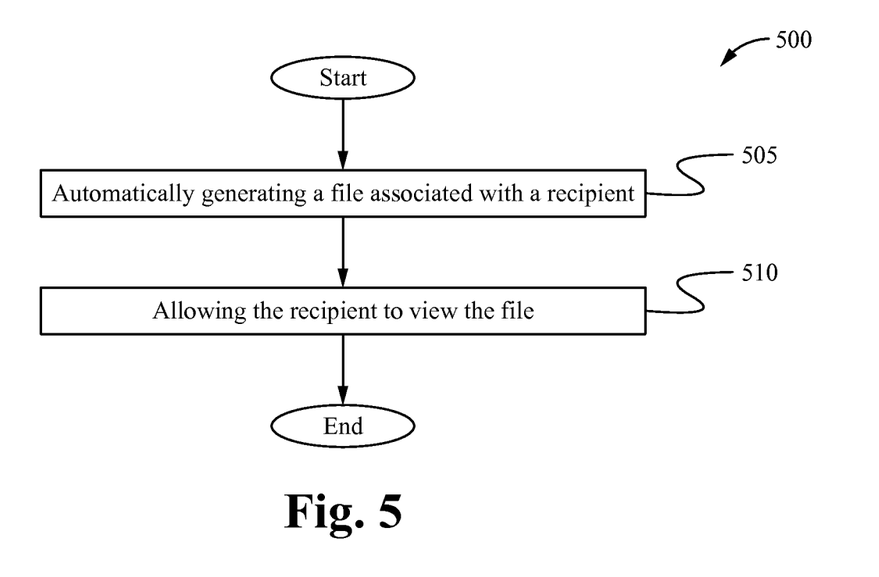
FIG. 5 illustrates a second exemplary method of acting upon a reminder according to an embodiment of the present invention.

Assume the user desires to act upon the reminder, the user is provided with a plurality of options, including an ability to send a gift or an ability to send an electronic wish to the recipient. FIGS. 4 and 5 each describes one of these options.

FIG. 4 illustrates a first exemplary method of acting upon a reminder 400 according to an embodiment of the present invention. The method 400 begins at a step 405, where the user is able to purchase a gift from an external provider 120 of FIG. 1 for the recipient. A gift can be physical gift or a digital gift, such as an e-gift card. The user is typically taken through a purchase routine, which includes presenting a menu of gifts, a menu of partnered providers 120, or the like. Alternatively or in addition to, the user is provided with at least one gift recommendation for the recipient based on the user's history. In some embodiments, the user's gift purchase via the service is monetized. In some embodiments, the recipient is notified about the gift prior to receiving the gift either by the external provider 120 and/or the service. After the step 405, the method 400 ends.

Alternatively or in addition to purchasing gift for the recipient, the user is able to make an electronic wish. The electronic wish can be a simple text or a file, which is provided to the recipient using one of the communication channels. Typically, content of the electronic wish is automatically generated, although the content can be manually generated by the user. FIG. 5 illustrates a second exemplary method of acting upon a reminder 500 according to an embodiment of the present invention. The method 500 begins at a step 505, where a file is automatically generated. In some embodiments, the file is generated according to user defined or predefined groups based on the one or more of the plurality of sources. The file can contain generic content, such as a picture of a birthday cake with "Happy Birthday!" below the picture. Alternatively or in addition to, the file can contain personal content generated around the recipient regarding the corresponding event. In some embodiments, the content includes the additional information that is pulled from one or more of the plurality of sources. The content can be generated using the user's backup data stored at a location that is accessible by the server. In some embodiments, the server maintains the location and provides MightyBackup®, which is a backup service of mobile content. The additional information can also be generated using remote data pulled from one or more of the plurality of sources 115 of FIG. 1. For example, videos and/or photos in Facebook® that are tagged with the recipient and the user can be pulled by the server. The additional information can also be generated using paid-for content through integration with content partners. In some embodiments, the user is charged for the use of the paid-for content.

The additional information typically becomes the content of the file. The file can be a media file or a multimedia file. An exemplary file is an image, a collage or a video. The file is automatically generated without the user needing to provide any content, thereby saving the user's time. Yet, the user is also able to manually generate the file by selecting the entirety of its contents. In some embodiments, after the file is generated, the user is able to view and edit the file before the file is made available to the recipient. For example, the user is able to add content to or remove content from the file. In some embodiments, the user is able to, using a one-click operation, make the file available to the recipient, no matter where the content came from. For example, during a voice call with the recipient, the file can be added to the voice call via the one-click operation. The file, such as a video or an audio, can start playing for the recipient. In some embodiments, the video can be a live video of the user.

At a step 510, the recipient is able to view the file. In some embodiments, the entirety of file is transmitted to the recipient, such as via email or the like. Alternatively, a reference to the file (which is stored in the cloud 110) is provided to the recipient, such as via a text message or the like. After the step 510 ends, the method 500 ends.

In some embodiments, if the recipient is not a subscriber, then after the recipient views the file, the recipient is asked whether the recipient would like to become a subscriber. If the recipient chooses to join the service, then the recipient is taken through a registration routine.

As explained above, the user is able to act upon the reminder in one or more manners. In one exemplary scenario, the user sends a text message, with a link to an automatically generated collage on the cloud 110, to a first recipient and orders flowers for the first recipient on the first recipient's wedding day. In another exemplary scenario, the user calls a second recipient, during which a video is shown to the second recipient, and purchases an electronic gift card to a toy store on the second recipient's birthday.

In some embodiments, the server implements a learning engine. The learning engine is configured to learn from tracked histories, such as collected user behavior of the subscribers, to determine which events are actually important to each subscriber and to alert each subscriber of only those important or relevant events to him or her. The user is therefore not bothered with events the user does not care about. In some embodiments, data such as the collected historical data are stored in one or more repositories accessible by the learning engine. In some embodiments, since the user is able to select a preferred channel of providing electronic wishes for a first group of contacts and another preferred channel of providing electronic wishes for a second group of contacts, the learning engine is also configured to learn from the collected user behavior to determine a preferred channel of providing electronic wishes and even an alternative preferred channel of providing electronic wishes. In some embodiments, the tracked history can be used for monetization purposes.

Figure 6:
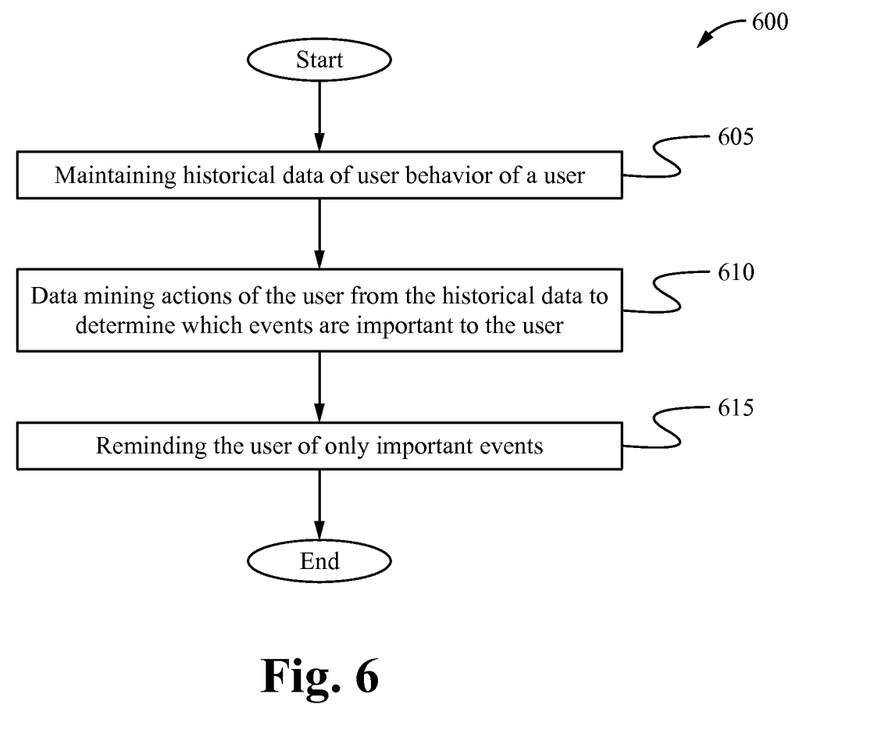
FIG. 6 illustrates an exemplary method of intelligently providing reminders of important events according to an embodiment of the present invention.

FIG. 6 illustrates an exemplary method of intelligently providing reminders of important events 600 according to an embodiment of the present invention. The method 600 begins at a step 605, where historical data of user behavior of a user while using the service is maintained in the one or more repositories.

At a step 610, actions of the user are data mined from the historical data to determine which events are important to the user. For example, if the user only sends wishes on birthdays but not for any other events, then the learning engine learns that only birthday events are important to the user.

At a step 615, the user is reminded of only those important events. For each of those important events, the user is typically provided with an option to act upon that reminder such that each of one or more recipients associated with that important event receives an acknowledgment regarding that important event. In some embodiments, if the acknowledgment is an electronic wish, then the acknowledgment is provided using an appropriate channel intelligently selected by the learning engine. After the step 615, the method 600 ends.

In some embodiments, if an important event happens to be the user's own birthday, the user is able to receive all birthday wishes across all networking services. The birthday wishes can be presented to the user in a slide show or a time line type view, with or without appropriate music. Similarly, a photo montage of all friends who have wished the user a happy birthday is presented to the user, with or without appropriate music. In some embodiments, the size of each photo in the montage is adjusted based on a social distance between the user and the happy birthday wisher. The social distance can be dependent on how often the user interacts with that happy birthday wisher.

In some embodiments, on the day of the user's birthday, the user is able to update a profile he/she with a networking service with a seal, such as candles, cake or any other image, to let others (e.g., user's connections) know that it is his/her birthday. In some embodiments, the user is presented with offers of goods/services from companies, such as the goods/services providers 120. In some embodiments, the user is also presented with a view of the user's previous birthdays to compare with the current birthday.

In some embodiments, if an important event happens to be a holiday, the user is able to receive historical events that have occurred on that day, important information about that holiday, or both. In some embodiments, the user is able to receive a list of people for whom this holiday is an occasion. This is particularly useful if the holiday is an important foreign holiday and some of the user's friends are located in that country. In some embodiments, an electronic wish is automatically generated with appropriate content for sending to one or more recipients in the list of people in various forms, such as the ones discussed above. For example, the electronic wish can be provided to the recipient during a voice call, in a text message, in an email, in an instant message, in a video chat, in a post to one of the user's live feed, or in a post to one of the recipient's profile.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
aggregating events from a plurality of sources, wherein the plurality of sources is pertinent to a user;
at a point in time within a period surrounding at least one of the events, reminding the user of that event and providing the user an option to act upon that reminder such that at least one recipient associated with that event receives an acknowledgment regarding that event;
generating a file associated with the at least one recipient, wherein the file is automatically generated based on one of a user defined group of contacts and a predefined group of contacts; and
allowing the user to edit the file prior to making the edited file available to the at least one recipient.

2. The non-transitory computer-readable medium of claim 1, wherein the plurality of sources includes at least one personal source, wherein the at least one personal source is at least one of a native address book and a native calendar of an end-user device, and wherein the option is presented to the user on the end-user device.

3. The non-transitory computer-readable medium of claim 1, wherein the plurality of sources includes at least one of one or more social networks and one or more professional networks.

4. The non-transitory computer-readable medium of claim 1, wherein the plurality of sources includes one or more public sources of information for events, wherein the at least one public source is located on the Internet.

5. The non-transitory computer-readable medium of claim 1, wherein the events include birthdays, anniversaries and holidays, wherein the holidays include at least one of national holiday and international holiday.

6. The non-transitory computer-readable medium of claim 1, wherein the events include the user's own personal events.

7. The non-transitory computer-readable medium of claim 1, wherein the reminding is in a form of one of an email, a text message, a device notification, voice call, video call, multimedia message, video message and printed notification.

8. The non-transitory computer-readable medium of claim 1, wherein the acknowledgment is in a form of one of a gift and an electronic wish.

9. The non-transitory computer-readable medium of claim 1, wherein the electronic wish is provided in a voice call, a text message, an email, an instant message, a video chat, a post to a live feed, and a post to a profile.

10. The non-transitory computer-readable medium of claim 1, wherein the file is one of a media file and a multimedia file.

11. The non-transitory computer-readable medium of claim 1, wherein the method further comprises, after generating a file, allowing the at least one recipient to view the file.

12. The non-transitory computer-readable medium of claim 11, wherein the file is included as part of an electronic wish.

13. The non-transitory computer-readable medium of claim 1, wherein reference to the file is included as part of an electronic wish.

14. The non-transitory computer-readable medium of claim 1, wherein the method further comprises, after providing the user with an option, enabling the user to purchase a gift from an external provider.

15. The non-transitory computer-readable medium of claim 14, wherein the gift is one of a physical gift and a digital gift.

16. The non-transitory computer-readable medium of claim 14, wherein the method further comprises, after enabling the user to purchase a gift, monetizing the gift purchase.

17. The non-transitory computer-readable medium of claim 1, wherein the method further comprises:
maintaining historical data of user behavior of the user; and
data mining actions of the user from the historical data to determine which events are important to the user to at least one of intelligently serve only events that are important to the user and intelligently select an appropriate channel of providing the acknowledgment to the at least one recipient.

18. The non-transitory computer-readable medium of claim 17, further comprising using the historical data for monetization.

19. A system comprising:
an end-user device including a memory for storing a native address book; and
a server in communication with at least the end-user device via a network, wherein the server hosts a service configured to:
pull events from a plurality of sources, wherein the plurality of sources includes the native address book and a remote location on the network;
learn from collected user behavior to determine which of the events are important to a user of the end-user device; and
for each of the important events, transmit a reminder to the end-user device of that important event and provide the user an option to act upon that reminder such that at least one recipient associated with that event receives an acknowledgment regarding that important event and automatically generate content selected from the group consisting of promotional content, personal content, and historical content around that important event, wherein the content is generated using data backed up by the user and accessible by the server.

20. The system of claim 19, wherein the user of the end-user device is subscribed to the service.

21. The system of claim 19, wherein the at least one recipient is not subscribed to the service.

22. The system of claim 19, wherein the events are manually pulled from the plurality of sources.

23. The system of claim 19, wherein the events are automatically pulled from the plurality of sources at periodic intervals.

24. The system of claim 19, wherein the service is also configured to provide an opportunity for the at least one recipient to subscribe to the service.

25. The system of claim 19, wherein the content is generated using remote data pulled from one or more of the plurality of sources.

26. The system of claim 19, wherein the acknowledgment is received by the at least one recipient via at least two communication channels.

27. The system of claim 19, wherein the service is also configured to provide the user on the user's birthday a photo montage of wishers.

28. The system of claim 27, wherein a size of each photo in the montage is adjusted according to a social distance between the user and the respective wisher shown in the photo.

29. The system of claim 19, wherein the content is generated at the same time that the events are pulled from the plurality of sources.

* * * * *